US012512110B2

(12) United States Patent
Chen et al.

(10) Patent No.: US 12,512,110 B2
(45) Date of Patent: Dec. 30, 2025

(54) INTELLIGENT CALL NOISE REDUCTION DEVICE, METHOD, AND HEADPHONE

(71) Applicant: Lanto Electronic Limited, Kunshan (CN)

(72) Inventors: Hsin-Nan Chen, Kunshan (CN); Tsung-Pao Hsu, Kunshan (CN); Jung-Pin Chien, Kunshan (CN); Yao-Chun Tsai, Kunshan (CN); Shao-Hsiang Chen, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 212 days.

(21) Appl. No.: 18/583,329

(22) Filed: Feb. 21, 2024

(65) Prior Publication Data

US 2025/0069612 A1 Feb. 27, 2025

(30) Foreign Application Priority Data

Aug. 22, 2023 (CN) ......................... 202311058150.3

(51) Int. Cl.
*G10L 21/0216* (2013.01)
*H04R 1/10* (2006.01)

(52) U.S. Cl.
CPC ........ *G10L 21/0216* (2013.01); *H04R 1/1008* (2013.01); *H04R 1/1075* (2013.01);
(Continued)

(58) Field of Classification Search
CPC ....... G10L 21/0216; G10L 2021/02166; G10L 21/0208; H04R 1/1008; H04R 1/1075;
(Continued)

(56) References Cited

U.S. PATENT DOCUMENTS

2007/0133825 A1* 6/2007 Waller, Jr. .............. G10H 3/186
381/94.1
2009/0240495 A1* 9/2009 Ramakrishnan .... G10L 21/0272
704/226

(Continued)

FOREIGN PATENT DOCUMENTS

CN 109686378 B 6/2021
CN 111373769 B 11/2022

*Primary Examiner* — Oyesola C Ojo

(74) *Attorney, Agent, or Firm* — Birch, Stewart, Kolasch & Birch, LLP

(57) ABSTRACT

Provided are an intelligent call noise reduction device, method, and headphone. The device includes a first microphone, a second microphone, a sound collecting and processing module and a loudspeaker unit. The first microphone is near to a primary talker sound source. The second microphone is near to a third-party talker sound source. The first microphone receives a talker sound source and generates a first voltage signal based on the talker sound source and receives a background sound source and generates a second voltage signal based on the background sound source. The second microphone receives the talker sound source and generates a third voltage signal based on the talker sound source and receives the background sound source and generates a fourth voltage signal based on the background sound source. The talker sound source includes the primary talker sound source and the third-party talker sound source.

10 Claims, 5 Drawing Sheets

(52) U.S. Cl.
CPC .. *H04R 1/1083* (2013.01); *G10L 2021/02166* (2013.01); *H04R 2201/107* (2013.01)

(58) Field of Classification Search
CPC ............ H04R 1/1083; H04R 2201/107; H04R 3/005; H04R 2410/05; H04R 2201/10
See application file for complete search history.

(56) References Cited

U.S. PATENT DOCUMENTS

2018/0048768 A1* 2/2018 Spittle .................... H04S 7/303
2022/0383848 A1* 12/2022 Darlington ........... H04R 1/1083

* cited by examiner

INTELLIGENT CALL NOISE REDUCTION DEVICE, METHOD, AND HEADPHONE

CROSS-REFERENCE TO RELATED APPLICATION(S)

This application claims priority to Chinese Patent Application No. 2023110581503 filed Aug. 22, 2023, the disclosure of which is incorporated herein by reference in its entirety.

TECHNICAL FIELD

Embodiments of the present invention relate to a noise reduction method, and in particular, to an intelligent call noise reduction device, method, and headphone.

BACKGROUND

With the development of headphone technology, wireless headphones are widely used due to advantages such as portability and convenient use. To ensure the user experience of an existing wireless headphone, it is a practice to reduce the environmental noise. Specifically, an output signal capable of canceling the external noise is generated by monitoring the environmental noise to compensate for the external noise. However, in this manner, all the environmental noise is canceled. In this manner, the wireless headphone cannot select the voice of the talker during the conversation with a person so that the wireless headphone cannot be applied in the scene. Meanwhile, the noise reduction effect of the noise reduction method in this mode is poor.

SUMMARY

The present invention provides an intelligent call noise reduction device, method, and headphone so that a third-party talker sound can be selected and a phase adjustment improves the noise reduction effect.

To achieve this object, an embodiment of the present invention provides an intelligent call noise reduction device. The device includes a first microphone, at least one second microphone, a sound collecting and processing module, and a loudspeaker unit. The first microphone is near to a primary talker sound source. The second microphone is near to a third-party talker sound source.

The first microphone is configured to receive a talker sound source and generate a first voltage signal based on the talker sound source and receive a background sound source and generate a second voltage signal based on the background sound source.

The second microphone is configured to receive the talker sound source and generate a third voltage signal based on the talker sound source and receive the background sound source and generate a fourth voltage signal based on the background sound source. The talker sound source includes a primary talker sound source and the third-party talker sound source. The first voltage signal and the third voltage signal have the same phase. The second voltage signal and the fourth voltage signal have different phases.

The sound collecting and processing module is configured to retain the talker sound source based on the first voltage signal and the third voltage signal and remove the background sound source based on the second voltage signal and the fourth voltage signal to send the talker sound source to the loudspeaker unit.

Alternatively, the device also includes a human body sensing module and a micro-processing module.

The human body sensing module is configured to sense whether another person is near to the second microphone and output a sensing signal to the micro-processing module when sensing that the another person is near to the second microphone. The micro-processing module is configured to send the sensing signal to the sound collecting and processing module.

The sound collecting and processing module is configured to send the primary talker sound source and the third-party talker sound source to the loudspeaker unit when receiving the sensing signal and send the primary talker sound source to the loudspeaker unit when receiving no sensing signal.

Alternatively, the first microphone is configured to, when no other person is close, receive the primary talker sound source and generate the first voltage signal based on the primary talker sound source and configured to assist in receiving the background sound source and generate the second voltage signal based on the background sound source.

The second microphone is configured to, when no other person is close, receive the background sound source and generate the fourth voltage signal based on the background sound source and configured to assist in receiving the primary talker sound source and generate a primary-call third voltage signal based on the primary talker sound source. The first voltage signal and the primary-call third voltage signal have the same phase. The second voltage signal and the fourth voltage signal have different phases.

The sound collecting and processing module is configured to, when receiving no sensing signal, retain the primary talker sound source based on the first voltage signal and the primary-call third voltage signal and remove the background sound source based on the second voltage signal and the fourth voltage signal to send the primary talker sound source to the loudspeaker unit.

Alternatively, the first microphone is also configured to, when another person is close, receive the primary talker sound source and generate a primary-call first voltage signal based on the primary talker sound source and also configured to assist in receiving the background sound source and the third-party talker sound source, generate the second voltage signal based on the background sound source, and generate a secondary-call first voltage signal based on the third-party talker sound source.

The second microphone is also configured to, when another person is close, receive the third-party talker sound source and the background sound source, generate a secondary-call third voltage signal based on the third-party talker sound source, and generate the fourth voltage signal based on the background sound source and configured to assist in receiving the primary talker sound source and generate a primary-call third voltage signal based on the primary talker sound source. The primary-call first voltage signal and the primary-call third voltage signal have the same phase. The secondary-call first voltage signal and the secondary-call third voltage signal have the same phase. The second voltage signal and the fourth voltage signal have different phases.

The sound collecting and processing module is configured to, when receiving the sensing signal, retain the primary talker sound source based on the primary-call first voltage signal and the primary-call third voltage signal, retain the third-party talker sound source based on the secondary-call first voltage signal and the secondary-call third voltage signal, and remove the background sound source based on the second voltage signal and the fourth voltage signal to send the primary talker sound source and the third-party talker sound source to the loudspeaker unit.

Alternatively, the device also includes at least one third microphone.

A third microphone of the at least one third microphone is configured to receive an environmental noise source and generate a fifth voltage signal based on the environmental noise source.

The first microphone is also configured to assist in receiving the environmental noise source and generate a sixth voltage signal based on the environmental noise source. The fifth voltage signal and the sixth voltage signal have different phases.

The sound collecting and processing module is also configured to remove the environmental noise source based on the fifth voltage signal and the sixth voltage signal when receiving the sensing signal to send the primary talker sound source and the third-party talker sound source to the loudspeaker unit and remove the environmental noise source based on the fifth voltage signal and the sixth voltage signal when receiving no sensing signal to send the primary talker sound source to the loudspeaker unit.

In a second aspect, an embodiment of the present invention provides an intelligent call noise reduction method. The method is applied to the intelligent call noise reduction device of the first aspect. The method includes receiving the first voltage signal generated by the first microphone based on the talker sound source and the second voltage signal generated by the first microphone based on the background sound source; receiving the third voltage signal generated by the second microphone based on the talker sound source and the fourth voltage signal generated by the second microphone based on the background sound source; and retaining the talker sound source based on the phase relationship between the first voltage signal and the third voltage signal and removing the background sound source based on the phase relationship between the second voltage signal and the fourth voltage signal to denoise the talker sound source.

Alternatively, the method also includes determining whether a sensing signal is received; in response to receiving the sensing signal, receiving the first voltage signal generated by the first microphone based on the primary talker sound source, receiving the second voltage signal generated by the first microphone based on the background sound source, receiving the fourth voltage signal generated by the second microphone based on the background sound source, receiving a primary-call third voltage signal generated by the second microphone based on the primary talker sound source, and executing a first noise reduction mode, where the first noise reduction mode includes retaining the primary talker sound source based on the first voltage signal and the third voltage signal and removing the background sound source based on the second voltage signal and the fourth voltage signal to denoise the primary talker sound source; and in response to receiving no sensing signal, receiving a primary-call first voltage signal generated by the first microphone based on the primary talker sound source, receiving the second voltage signal generated by the first microphone based on the background sound source, receiving a secondary-call first voltage signal generated by the first microphone based on the third-party talker sound source, receiving the fourth voltage signal generated by the second microphone based on the background sound source, generating a secondary-call third voltage signal based on the third-party talker sound source, generating a primary-call third voltage signal based on the primary talker sound source, and executing a second noise reduction mode, where the second noise reduction mode includes retaining the talker sound source based on the primary-call first voltage signal and the primary-call third voltage signal, retaining the third-party talker sound source based on the secondary-call first voltage signal and the secondary-call third voltage signal, and removing the background sound source based on the phase relationship between the second voltage signal and the fourth voltage signal to denoise the primary talker sound source and the third-party talker sound source.

Alternatively, the intelligent call noise reduction device also includes at least one third microphone.

Alternatively, the intelligent call noise reduction method also includes receiving a fifth voltage signal generated by a third microphone of the at least one third microphone based on an environmental noise source; in response to receiving the sensing signal, also receiving a sixth voltage signal generated by the first microphone based on the environmental noise source and executing a third noise reduction mode, where the third noise reduction mode includes retaining the primary talker sound source based on the first voltage signal and the third voltage signal, removing the background sound source based on the second voltage signal and the fourth voltage signal, and removing the environmental noise source based on the fifth voltage signal and the sixth voltage signal to denoise the primary talker sound source; and in response to receiving no sensing signal, also receiving a sixth voltage signal generated by the first microphone based on the environmental noise source and executing a fourth noise reduction mode, where the fourth noise reduction mode includes retaining the primary talker sound source based on the primary-call first voltage signal and the primary-call third voltage signal, retaining the third-party talker sound source based on the secondary-call first voltage signal and the secondary-call third voltage signal, removing the background sound source based on the second voltage signal and the fourth voltage signal, and removing the environmental noise source based on the fifth voltage signal and the sixth voltage signal to denoise the primary talker sound source and the third-party talker sound source.

Alternatively, the method also includes performing passive noise reduction on the retained primary talker sound source and a retained secondary talker sound source.

In a third aspect, an embodiment of the present invention provides an intelligent call noise reduction headphone. The headphone includes a first microphone, a second microphone, a sound collecting and processing module, a loudspeaker unit, a left earmuff, and a right earmuff. The first microphone is near to a primary talker sound source and disposed on the left earmuff. The second microphone is near to a third-party talker sound source and disposed on the right earmuff. The sound collecting and processing module and the loudspeaker unit are disposed inside the left earmuff.

The first microphone is configured to receive a talker sound source and generate a first voltage signal based on the talker sound source and receive a background sound source and generate a second voltage signal based on the background sound source.

The second microphone is configured to receive the talker sound source and generate a third voltage signal based on the talker sound source and receive the background sound source and generate a fourth voltage signal based on the background sound source. The talker sound source includes the primary talker sound source and the third-party talker sound source. The first voltage signal and the third voltage signal have the same phase. The second voltage signal and the fourth voltage signal have different phases.

The sound collecting and processing module is configured to retain the primary talker sound source based on the first voltage signal and the third voltage signal and remove the background sound source based on the second voltage signal and the fourth voltage signal to send the talker sound source to the loudspeaker unit.

In embodiments of the present invention, the first microphone is configured to receive a talker sound source and generate a first voltage signal based on the talker sound source and receive a background sound source and generate a second voltage signal based on the background sound source; the second microphone is configured to receive the talker sound source and generate a third voltage signal based on the talker sound source and receive the background sound source and generate a fourth voltage signal based on the background sound source, where the talker sound source includes the primary talker sound source and the third-party talker sound source, the first voltage signal and the third voltage signal have the same phase, and the second voltage signal and the fourth voltage signal have different phases; and the sound collecting and processing module is configured to retain the talker sound source based on the first voltage signal and the third voltage signal and remove the background sound source based on the second voltage signal and the fourth voltage signal to send the talker sound source to the loudspeaker unit. In this manner, the primary talker sound and the third-party talker sound can be received, filtering of the third-party call sound source can be saved, and the primary call and the third-party call can be denoised effectively by using the phase relationship.

DETAILED DESCRIPTION

Figure 1:
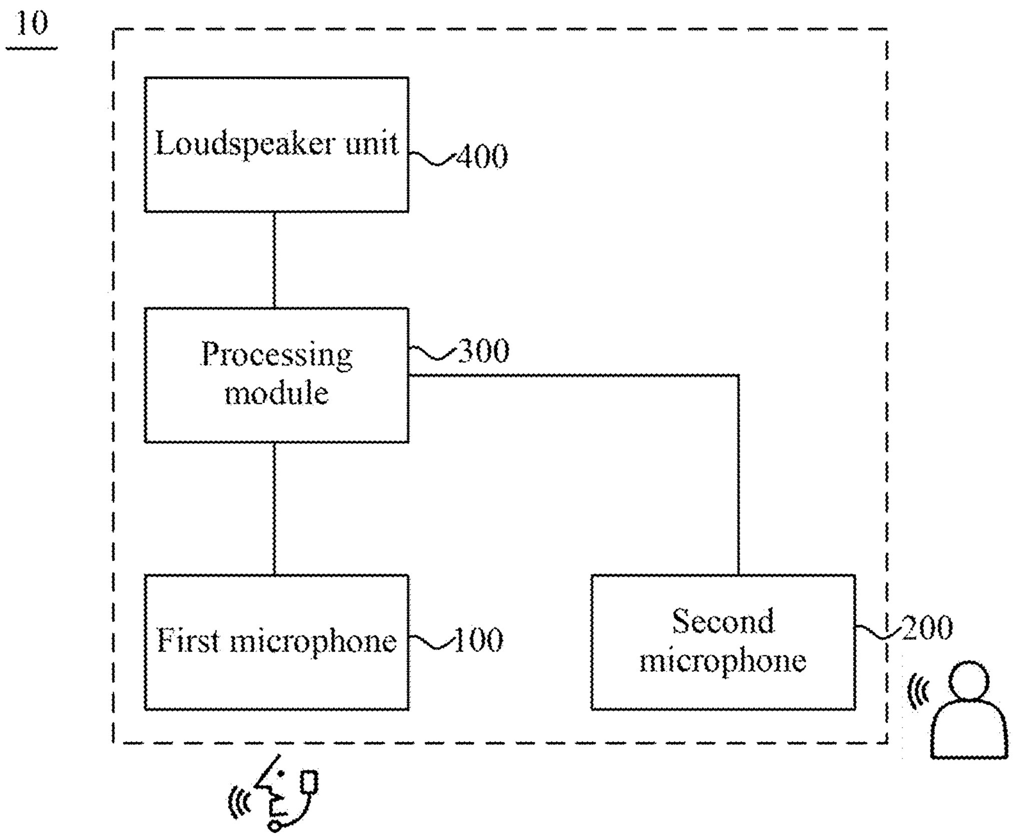
FIG. 1 is a diagram illustrating the structure of an intelligent call noise reduction device according to an embodiment of the present invention.

The present invention is described hereinafter in detail in conjunction with drawings and embodiments. It is to be understood that the embodiments described herein are intended to explain the present invention and not to limit the present invention. Additionally, it is to be noted that for ease of description, only part, not all, of the structures related to the present invention are illustrated in the drawings.

FIG. 1 is a diagram illustrating the structure of an intelligent call noise reduction device according to an embodiment of the present invention. As shown in FIG. 1, the device 10 includes a first microphone 100, at least one second microphone 200, a sound collecting and processing module 300, and a loudspeaker unit 400. The first microphone 100 is near to a primary talker sound source. The second microphone 200 is near to a third-party talker sound source. The first microphone 100 is configured to receive a talker sound source and generate a first voltage signal based on the talker sound source and receive a background sound source and generate a second voltage signal based on the background sound source. The second microphone 200 is configured to receive the talker sound source and generate a third voltage signal based on the talker sound source and receive the background sound source and generate a fourth voltage signal based on the background sound source. The talker sound source includes the primary talker sound source and the third-party talker sound source. The first voltage signal and the third voltage signal have the same phase. The second voltage signal and the fourth voltage signal have different phases. The sound collecting and processing module 300 is configured to retain the talker sound source based on the first voltage signal and the third voltage signal and remove the background sound source based on the second voltage signal and the fourth voltage signal to send the talker sound source to the loudspeaker unit 400.

The talker sound source is classified into the primary talker sound source and the third-party talker sound source. The background sound source is classified into a distant person's background sound source and a distant noise interference source. The background sound source overlaps the primary talker sound source and the third-party talker sound source.

The primary talker sound and the third-party talker sound propagate in the form of waves. In this embodiment, the first microphone 100 is near to the primary talker sound source, and the second microphone 200 is near to the third-party talker sound source. The second microphone 200 is disposed at an end facing away from the first microphone 100. The first microphone 100 can receive the primary talker sound source and can also receive the third-party talker sound source. The second microphone 200 can receive the third-party talker sound source and can also receive the primary talker sound source. The distance by which the third-party talker sound source propagates to the first microphone 100 is almost the same as the distance by which the primary talker sound source propagates to the second microphone 200 and the distance by which the third-party talker sound source propagates to the second microphone 200; therefore, since the distance between the first microphone 100 and the second microphone 200 is less than the preset distance, the first voltage signal generated by the first microphone 100 based on the primary talker sound source and the third-party talker sound source and the third voltage signal generated by the second microphone 200 based on the primary talker sound source and the third-party talker sound source have the same phase. The background sound source propagates in the form of waves. The first microphone 100 and the second microphone 200 can receive the background sound source. The distance by which the distant person's background sound propagates to the first microphone 100 is different from the distance by which the distant person's background sound propagates to the second microphone 200; therefore, the third voltage signal generated by the first microphone 100 based on the background sound source and the fourth voltage signal generated by the second microphone 200 based on the background sound source have different phases.

In this embodiment, the sound collecting and processing module 300 retains sound sources that involve the same phase and removes sound sources that involve different phases. That is, the sound collecting and processing module 300 retains the talker sound source based on the first voltage signal and the third voltage signal and removes the background sound source based on the second voltage signal and the fourth voltage signal. The talker sound source is thus sent to the loudspeaker unit 400. In this manner, the background sound source is removed with a better noise reduction effect. Additionally, in this solution, the primary talker sound and the third-party talker sound can be received. Thus, filtering of the third-party call sound source by compensation by an output signal generated to offset the environmental noise can be saved in the related art.

Figure 2:
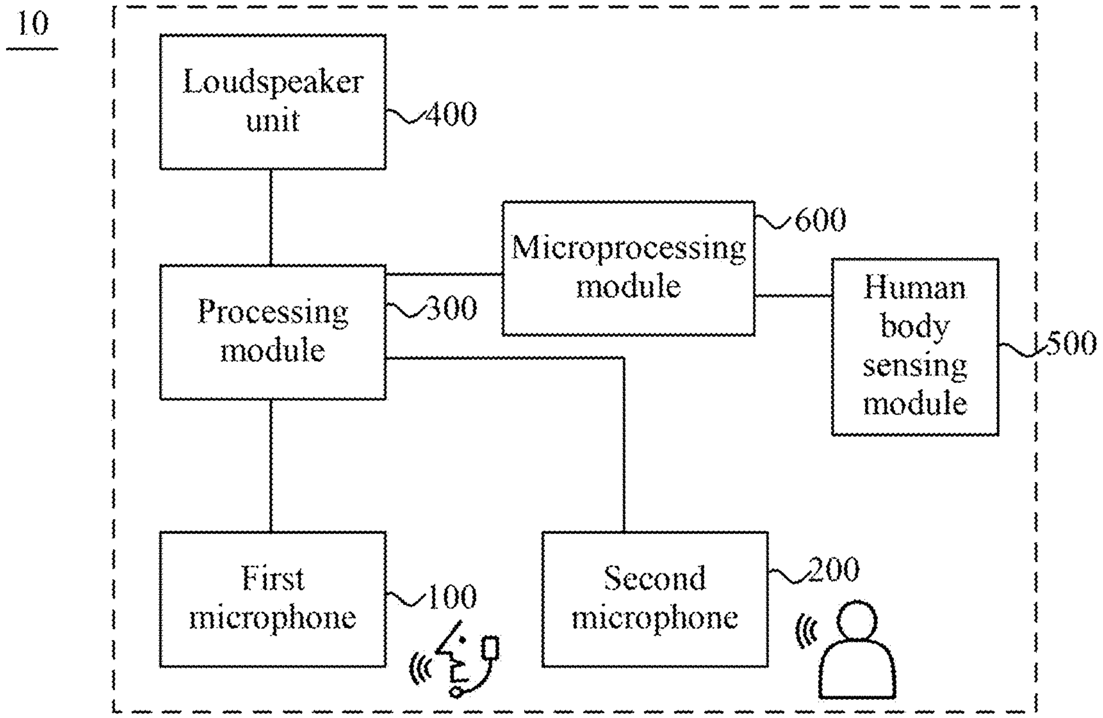
FIG. 2 is a diagram illustrating the structure of another intelligent call noise reduction device according to an embodiment of the present invention.

Based on this noise reduction principle, in view that some scenarios may not contain a third-party talker sound source, this embodiment gives more details than the previous embodiment. FIG. 2 is a diagram illustrating the structure of another intelligent call noise reduction device according to an embodiment of the present invention. As shown in FIG. 2, the device also includes a human body sensing module 500 and a micro-processing module 600. The human body sensing module 500 is configured to sense whether another person is near to the second microphone 200 and output a sensing signal to the micro-processing module 600. The micro-processing module 600 is configured to send the sensing signal to the sound collecting and processing module 300.

The sound collecting and processing module 300 is configured to send the primary talker sound source and the third-party talker sound source to the loudspeaker unit 400 when receiving the sensing signal and send the primary talker sound source to the loudspeaker unit 400 when receiving no sensing signal.

The human body sensing module 500 may be, for example, an infrared sensor or a millimeter-wave radar. The human body sensing module 500 may be configured to sense whether a human body is near to the second microphone 200. The type of the human body sensing module 500 is not limited by this embodiment.

The first microphone 100 is configured to, when no other person is close, receive the primary talker sound source and generate the first voltage signal based on the primary talker sound source and configured to assist in receiving the background sound source and generate the second voltage signal based on the background sound source. The second microphone 200 is configured to, when no other person is close, receive the background sound source and generate the fourth voltage signal based on the background sound source and configured to assist in receiving the primary talker sound source and generate a primary-call third voltage signal based on the primary talker sound source. The first voltage signal and the primary-call third voltage signal have the same phase. The second voltage signal and the fourth voltage signal have different phases. The sound collecting and processing module 300 is configured to, when receiving the sensing signal, retain the primary talker sound source based on the first voltage signal and the primary-call third voltage signal and remove the background sound source based on the second voltage signal and the fourth voltage signal to send the primary talker sound source to the loudspeaker unit 400. Thus, only the primary talker sound source is sent to the loudspeaker unit 400. In this manner, the background sound source is removed with a better noise reduction effect.

The first microphone 100 is also configured to, when another person is close, receive the primary talker sound source and generate a primary-call first voltage signal based on the primary talker sound source and also configured to assist in receiving the background sound source and the third-party talker sound source, generate the second voltage signal based on the background sound source, and generate a secondary-call first voltage signal based on the third-party talker sound source. The second microphone 200 is also configured to, when another person is close, receive the third-party talker sound source and the background sound source, generate the fourth voltage signal based on the background sound source, and generate a secondary-call third voltage signal based on the third-party talker sound source and configured to assist in receiving the primary talker sound source and generate a primary-call third voltage signal based on the primary talker sound source. The primary-call first voltage signal and the primary-call third voltage signal have the same phase. The secondary-call first voltage signal and the secondary-call third voltage signal have the same phase. The second voltage signal and the fourth voltage signal have different phases. The sound collecting and processing module 300 is configured to, when receiving the sensing signal, retain the primary talker sound source based on the primary-call first voltage signal and the primary-call third voltage signal, retain the third-party talker sound source based on the secondary-call first voltage signal and the secondary-call third voltage signal, and remove the background sound source based on the second voltage signal and the fourth voltage signal to send the primary talker sound source and the third-party talker sound source to the loudspeaker unit 400. Thus, the primary talker sound source and the third-party talker sound source are sent to the loudspeaker unit 400. In this manner, the background sound source is removed. In this solution, automatic switching between different noise reduction modes can be achieved based on the sensing signal output by the human body sensing module, and filtering of the third-party call sound source can be saved.

It is to be understood that the first microphone 100 receives the primary talker sound source, and assists in receiving the background sound source and the third-party talker sound source, or assists in receiving the background sound source can be construed as that since the target sound source is near to the first microphone 100, the strength of the voltage signal generated by the first microphone 100 based on the received primary talker sound source is greater than the strength of a voltage signal generated based on another sound source; and the second microphone 200 receives the background sound source, or receives the third-party talker sound source and the background sound source, and assists in receiving the primary talker sound source can be construed as that since the third-party talker sound source is near to the second microphone 200, the strength of the voltage signal generated by the second microphone 200 based on the received third-party talker sound source is greater than the strength of a voltage signal generated based on another sound source.

Figure 3:
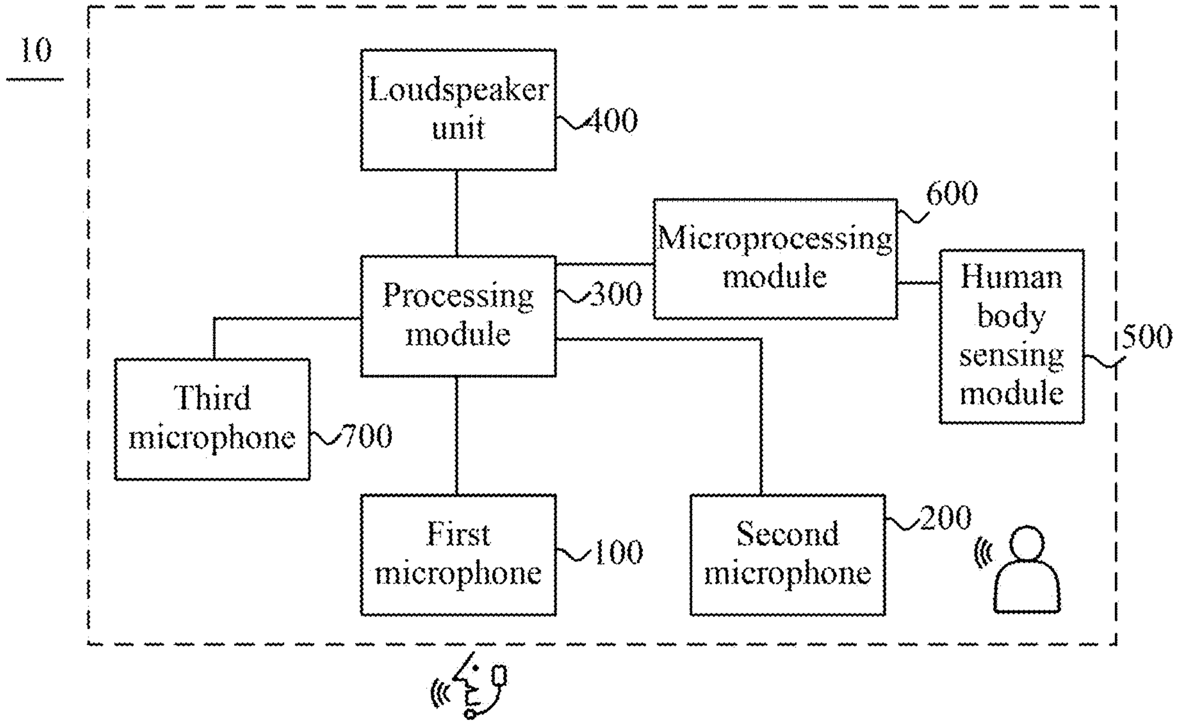
FIG. 3 is a diagram illustrating the structure of another intelligent call noise reduction device according to an embodiment of the present invention.

FIG. 3 is a diagram illustrating the structure of another intelligent call noise reduction device according to an embodiment of the present invention. As shown in FIG. 3, the device also includes at least one third microphone 700. A third microphone 700 of the at least one third microphone 700 is configured to receive an environmental noise source and generate a fifth voltage signal based on the environmental noise source. The first microphone 100 is also configured to assist in receiving the environmental noise source and generate a sixth voltage signal based on the environmental noise source. The fifth voltage signal and the sixth voltage signal have different phases. The sound collecting and processing module 300 is also configured to remove the environmental noise source based on the fifth voltage signal and the sixth voltage signal when receiving the sensing signal to send the primary talker sound source and the third-party talker sound source to the loudspeaker unit 400 and remove the environmental noise source based on the fifth voltage signal and the sixth voltage signal when receiving no sensing signal to send the primary talker sound source to the loudspeaker unit 400.

The environmental noise source may include an electrical noise caused by an internal or external circuit of the noise reduction device and may also include a non-human environmental noise such as an external machine sound. The primary talker sound, the third-party talker sound, the background sound source, and the environmental noise source propagate in the form of waves. In the presence or absence of a person, the first microphone 100 and the third microphone 700 can receive the environmental noise source. The distance by which the environmental noise source propagates to the first microphone 100 is different from the distance by which the environmental noise source propagates to the third microphone 700; therefore, the sixth voltage signal generated by the first microphone 100 based on the environmental noise source and the fifth voltage signal generated by the third microphone 700 based on the environmental noise source have different phases.

With the third microphone 700 added based on the previous embodiment, the sound collecting and processing module 300 is configured to, when receiving a sensing signal, remove the environmental noise source based on the fifth voltage signal and the sixth voltage signal and retain the primary talker sound source based on the primary-call first voltage signal and the primary-call third voltage signal; retain the third-party talker sound source based on the secondary-call first voltage signal and the secondary-call third voltage signal; and remove the background sound source based on the second voltage signal and the fourth voltage signal to send the primary talker sound source and the third-party talker sound source to the loudspeaker unit 400. In this manner, the primary talker sound source and the third-party talker sound source can be retained, and the environmental noise source and the background sound source can be removed.

With the third microphone 700 added based on the previous embodiment, the sound collecting and processing module 300 is configured to, when receiving no sensing signal, remove the environmental noise source based on the fifth voltage signal and the sixth voltage signal; retain the primary talker sound source based on the first voltage signal and the primary-call third voltage signal; and remove the background sound source based on the second voltage signal and the fourth voltage signal. In this manner, the primary talker sound source can be retained, and the environmental noise source and the background sound source can be removed.

Based on the preceding noise reduction principle that sound sources that involve the same phase are retained and sound sources that involve different phases are removed, in this embodiment, when the human body sensing module outputs a sensing signal, the sound collecting and processing module 300 may retain the primary talker sound source and the third-party talker sound source and remove the environmental noise source and the background sound source; and when the human body sensing module outputs no sensing signal, the sound collecting and processing module 300 may retain the primary talker sound source and remove the environmental noise source and the background sound source. In this manner, this solution based on the previous embodiment also removes the environmental noise source, improving the noise reduction effect of a different mode.

It is to be noted that in this noise reduction process of retaining sound sources that involve the same phase and removing sound sources that involve different phases, the sound collecting and processing module 300 can better reduce the remaining denoised background sound source gain and environmental noise source, thereby better removing the interference source, improving the noise reduction effect, and ensuring the quality of the primary talker sound source and the quality of the third-party talker sound source.

The micro-processing unit 600 may also perform passive noise reduction on the retained primary talker sound source and third-party talker sound source and output the denoised talk sound to the loudspeaker unit 400. The passive noise reduction method may include a neural network model noise reduction software method. Passive noise reduction can better improve the noise reduction effect.

Figure 4:
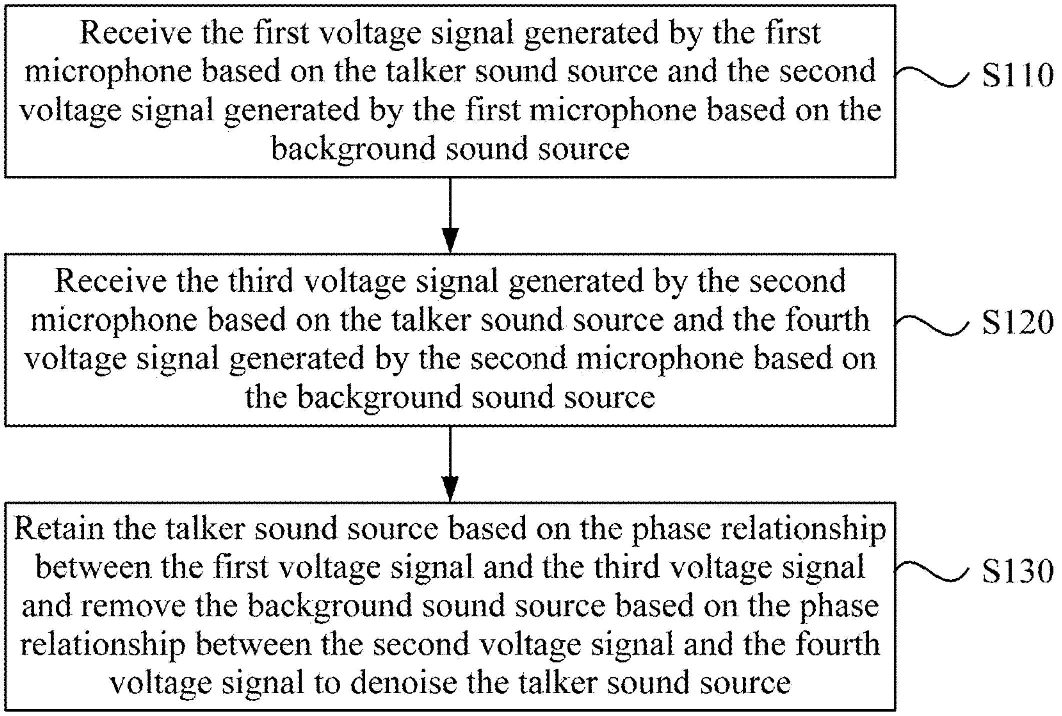
FIG. 4 is a flowchart of an intelligent call noise reduction method according to an embodiment of the present invention.

Based on the same inventive concept, an embodiment of the present invention provides an intelligent call noise reduction method. The method is applied to the intelligent call noise reduction device of any previous embodiment. FIG. 4 is a flowchart of an intelligent call noise reduction method according to an embodiment of the present invention. As shown in FIG. 4, the method includes S110, S120, and S130.

In S110, the first voltage signal generated by the first microphone based on the talker sound source and the second voltage signal generated by the first microphone based on the background sound source are received.

In S120, the third voltage signal generated by the second microphone based on the talker sound source and the fourth voltage signal generated by the second microphone based on the background sound source are received.

In S130, the talker sound source is retained based on the phase relationship between the first voltage signal and the third voltage signal, and the background sound source is removed based on the phase relationship between the second voltage signal and the fourth voltage signal so that the talker sound source is denoised.

In this embodiment, based on the noise reduction method of retaining sound sources that involve the same phase and removing sound sources that involve different phases, the background sound source is removed with a better noise reduction effect. Additionally, in this solution, the primary talker sound and the third-party talker sound can be received. Thus, filtering of the external secondary call by compensation by an output signal generated to offset the environmental noise can be saved in the related art.

Figure 5:
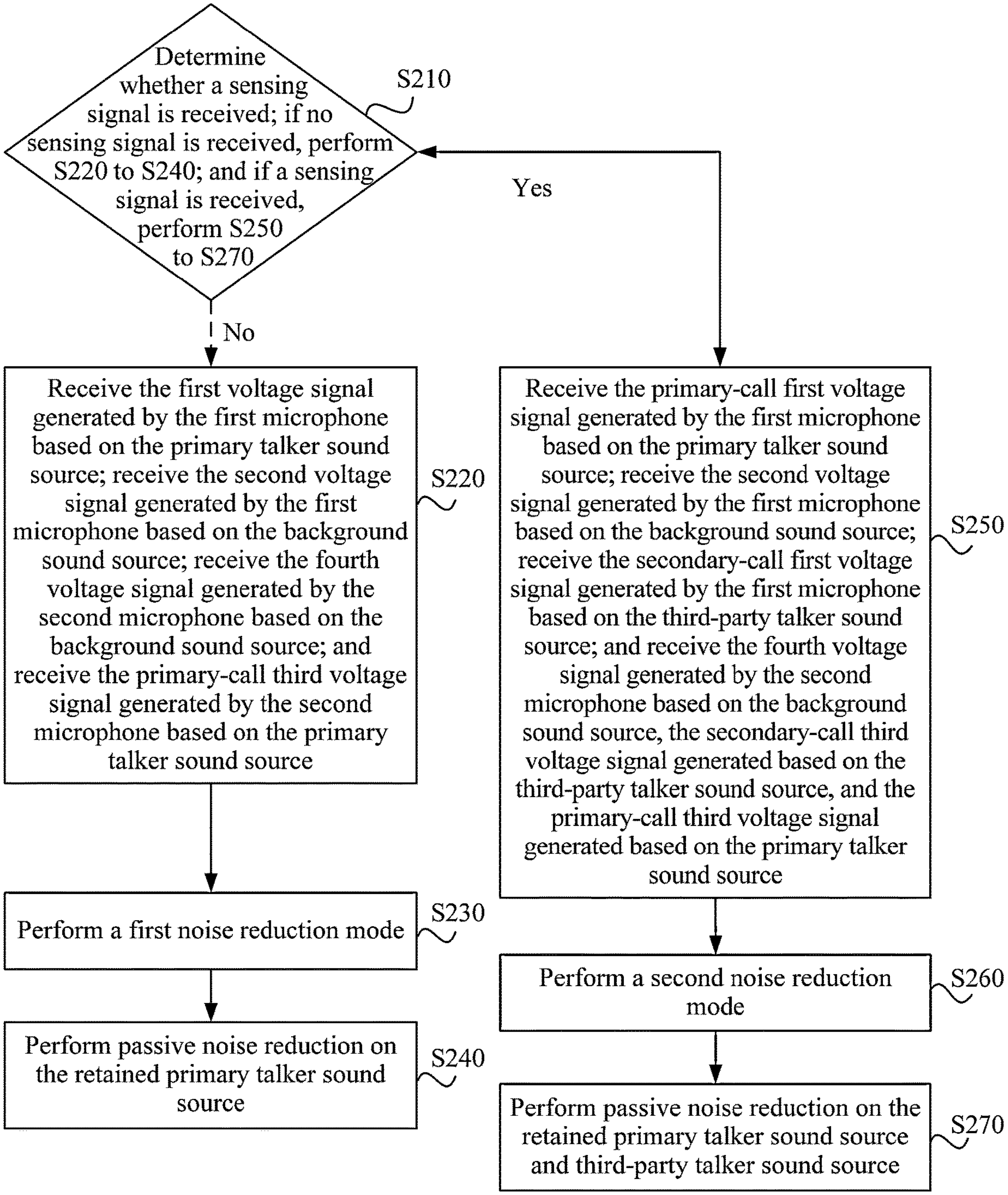
FIG. 5 is a flowchart of another intelligent call noise reduction method according to an embodiment of the present invention.

This embodiment gives more details than the previous embodiment. FIG. 5 is a flowchart of another intelligent call noise reduction method according to an embodiment of the present invention. As shown in FIG. 5, the method includes S210, S220, S230, S240, S250, S260, and S270.

In S210, it is determined whether a sensing signal is received; if no sensing signal is received, S220 to S240 are performed; and if a sensing signal is received, S250 to S270 are performed.

In S220, the first voltage signal generated by the first microphone based on the primary talker sound source is received; the second voltage signal generated by the first microphone based on the background sound source is received; the fourth voltage signal generated by the second microphone based on the background sound source is received; and the primary-call third voltage signal generated by the second microphone based on the primary talker sound source is received.

In S230, a first noise reduction mode is performed.

The first noise reduction mode is to retain the primary talker sound source based on the first voltage signal and the third voltage signal and remove the background sound source based on the second voltage signal and the fourth voltage signal to denoise the primary talker sound source. The first noise reduction mode can better reduce the remaining denoised background sound source gain and environmental noise source, thereby better removing the interference source and improving the noise reduction effect.

In S240, passive noise reduction is performed on the retained primary talker sound source.

In S250, the primary-call first voltage signal generated by the first microphone based on the primary talker sound source is received; the second voltage signal generated by the first microphone based on the background sound source is received; the secondary-call first voltage signal generated by the first microphone based on the third-party talker sound source is received; and the fourth voltage signal generated by the second microphone based on the background sound source, the secondary-call third voltage signal generated based on the third-party talker sound source, and the primary-call third voltage signal generated based on the primary talker sound source are received.

In S260, a second noise reduction mode is performed.

The second noise reduction mode is to retain the primary talker sound source based on the primary-call first voltage signal and the primary-call third voltage signal, retain the third-party talker sound source based on the secondary-call first voltage signal and the secondary-call third voltage signal, and remove the background sound source based on the phase relationship between the second voltage signal and the fourth voltage signal to denoise the primary talker sound source and the third-party talker sound source. The second noise reduction mode can better reduce the remaining denoised background sound source gain, thereby better removing the interference source and improving the noise reduction effect.

In S270, passive noise reduction is performed on the retained primary talker sound source and third-party talker sound source.

In this solution, automatic switching between different noise reduction modes can be achieved based on the sensing signal output by the human body sensing module, and the noise reduction effect can be better reduced.

Figure 6:
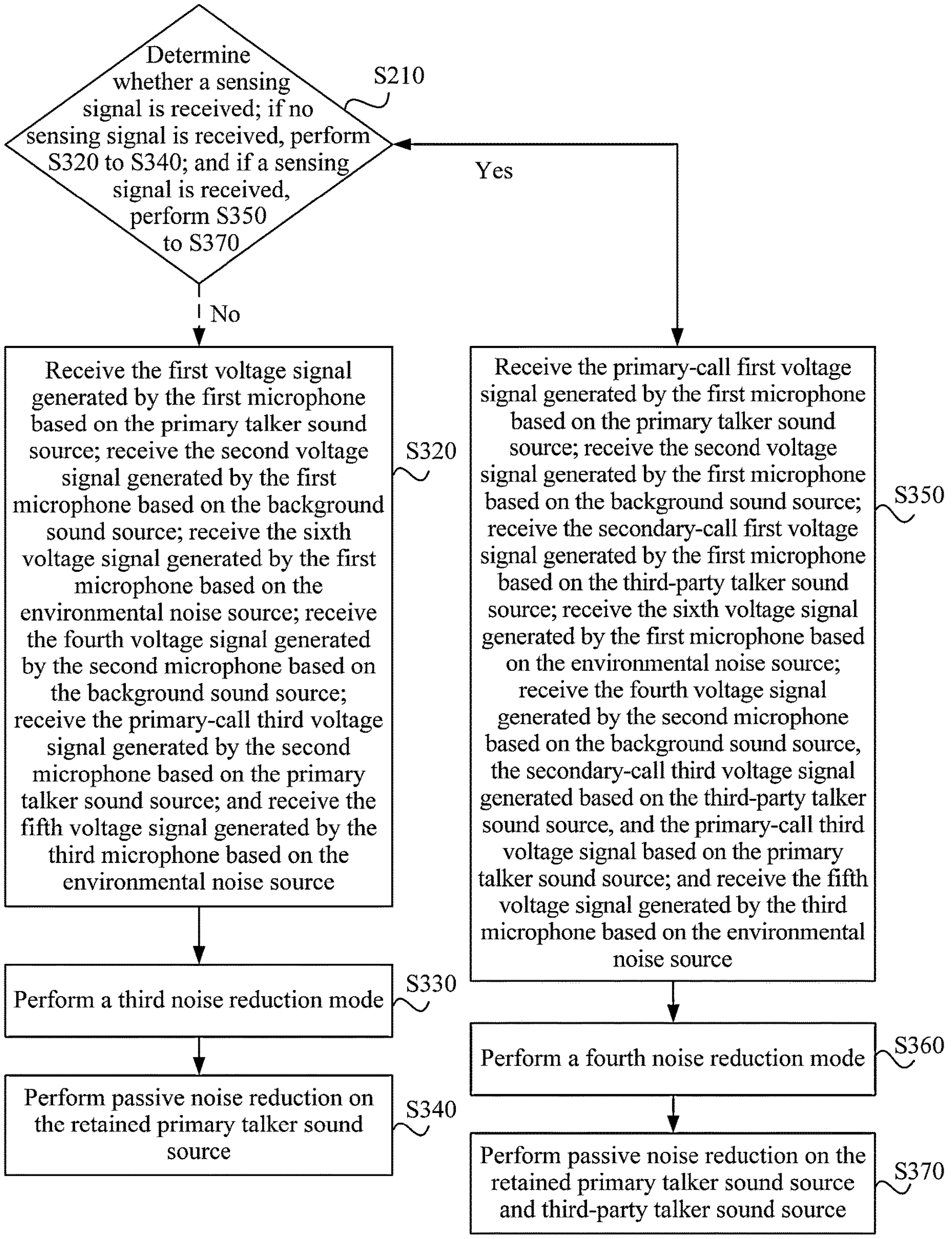
FIG. 6 is a flowchart of another intelligent call noise reduction method according to an embodiment of the present invention.

Further, in view that the intelligent call noise reduction device also includes a third microphone, this solution provides another intelligent call noise reduction method. FIG. 6 is a flowchart of another intelligent call noise reduction method according to an embodiment of the present invention. As shown in FIG. 6, the method includes S310, S320, S330, S340, S350, S360, and S370.

In S310, it is determined whether a sensing signal is received; if no sensing signal is received, S320 to S340 are performed; and if a sensing signal is received, S350 to S370 are performed.

In S320, the first voltage signal generated by the first microphone based on the primary talker sound source is received; the second voltage signal generated by the first microphone based on the background sound source is received; the sixth voltage signal generated by the first microphone based on the environmental noise source is received; the fourth voltage signal generated by the second microphone based on the background sound source is received; the primary-call third voltage signal generated by the second microphone based on the primary talker sound source is received; and the fifth voltage signal generated by the third microphone based on the environmental noise source is received.

In S330, a third noise reduction mode is performed.

The third noise reduction mode is to retain the primary talker sound source based on the first voltage signal and the third voltage signal, remove the background sound source based on the second voltage signal and the fourth voltage signal, and remove the environmental noise source based on the fifth voltage signal and the sixth voltage signal to denoise the primary talker sound source.

The third noise reduction mode can better reduce the remaining denoised background sound source gain and environmental noise source, thereby better removing the interference source and improving the noise reduction effect.

In S340, passive noise reduction is performed on the retained primary talker sound source.

In S350, the primary-call first voltage signal generated by the first microphone based on the primary talker sound source is received; the second voltage signal generated by the first microphone based on the background sound source is received; the secondary-call first voltage signal generated by the first microphone based on the third-party talker sound source is received; the sixth voltage signal generated by the first microphone based on the environmental noise source is received; the fourth voltage signal generated by the second microphone based on the background sound source, the secondary-call third voltage signal generated based on the third-party talker sound source, and the primary-call third voltage signal based on the primary talker sound source are received; and the fifth voltage signal generated by the third microphone based on the environmental noise source is received.

In S360, a fourth noise reduction mode is performed.

The fourth noise reduction mode is to retain the primary talker sound source based on the primary-call first voltage signal and the primary-call third voltage signal, retain the third-party talker sound source based on the secondary-call first voltage signal and the secondary-call third voltage signal, and remove the background sound source based on the phase relationship between the second voltage signal and the fourth voltage signal and remove the environmental noise source based on the fifth voltage signal and the sixth voltage signal to denoise the primary talker sound source and the third-party talker sound source. The second noise reduction mode can better reduce the remaining denoised background sound source gain, thereby better removing the interference source and improving the noise reduction effect.

In S370, passive noise reduction is performed on the retained primary talker sound source and third-party talker sound source.

In this solution, with the third microphone added in the intelligent call noise reduction device, automatic switching between different noise reduction modes can be achieved based on the sensing signal output by the human body sensing module, and the noise reduction effect can be better reduced.

Figure 7:
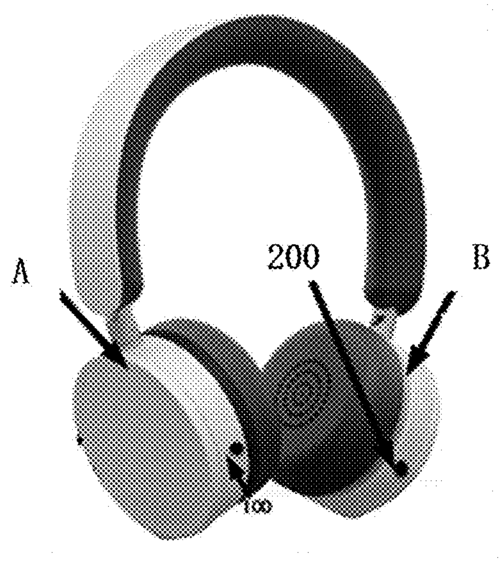
FIG. 7 is a diagram illustrating the structure of an intelligent call noise reduction headphone according to an embodiment of the present invention.

An embodiment of the present invention provides an intelligent call noise reduction headphone. FIG. 7 is a diagram illustrating the structure of an intelligent call noise reduction headphone according to an embodiment of the present invention. As shown in FIG. 7, the headphone includes a first microphone 100, a second microphone 200, a sound collecting and processing module 300, a loudspeaker unit 400, a left earmuff A, and a right earmuff B. The first microphone 100 is near to a primary talker sound source and disposed on the left earmuff A. The second microphone 200 is near to a third-party talker sound source and disposed on the right earmuff B. The sound collecting and processing module 300 and the loudspeaker unit 400 are disposed inside the left earmuff (not shown). The first microphone 100 is configured to receive a talker sound source and generate a first voltage signal based on the talker sound source and receive a background sound source and generate a second voltage signal based on the background sound source. The second microphone 200 is configured to receive the talker sound source and generate a third voltage signal based on the talker sound source and receive the background sound source and generate a fourth voltage signal based on the background sound source. The talker sound source includes a primary talker sound source and the third-party talker sound source. The first voltage signal and the third voltage signal have the same phase. The second voltage signal and the fourth voltage signal have different phases. The sound collecting and processing module 300 is configured to retain the primary talker sound source based on the first voltage signal and the third voltage signal and remove the background sound source based on the second voltage signal and the fourth voltage signal to send the talker sound source to the loudspeaker unit 400. The headphone has the beneficial effects of the previous embodiments. These effects are not described again here.

Alternatively, the noise reduction headphone also includes a third microphone. The third microphone is configured to receive an environmental noise source and generate a fifth voltage signal based on the environmental noise source. The first microphone 100 is also configured to assist in receiving the environmental noise source and generate a sixth voltage signal based on the environmental noise source. The fifth voltage signal and the sixth voltage signal have different phases. Based on the preceding noise reduction principle that sound sources that involve the same phase are retained and sound sources that involve different phases are removed, in this embodiment, when the human body sensing module outputs a sensing signal, the sound collecting and processing module 300 may retain the primary talker sound source and the third-party talker sound source and remove the environmental noise source and the background sound source; and when the human body sensing module outputs no sensing signal, the sound collecting and processing module 300 may retain the primary talker sound source and remove the environmental noise source and the background sound source. In this manner, this solution based on the previous embodiment also removes the environmental noise source, improving the noise reduction effect of a different mode.

It is to be noted that the preceding are preferred embodiments of the present invention and technical principles used therein. It is to be understood by those skilled in the art that the present invention is not limited to the embodiments described herein. Those skilled in the art can make various apparent modifications, adaptations, and substitutions without departing from the scope of the present invention. Therefore, while the present invention is described in detail through the preceding embodiments, the present invention is not limited to the preceding embodiments and may include equivalent embodiments without departing from the concept of the present invention. The scope of the present invention is determined by the scope of the appended claims.

What is claimed is:

1. An intelligent call noise reduction device, comprising a first microphone, at least one second microphone, a sound collecting and processing module, and a loudspeaker unit, wherein the first microphone is near to a primary talker sound source, and the second microphone is near to a third-party talker sound source;

the first microphone is configured to receive a talker sound source and generate a first voltage signal based on the talker sound source and is configured to receive a background sound source and generate a second voltage signal based on the background sound source;

the second microphone is configured to receive the talker sound source and generate a third voltage signal based on the talker sound source and is configured to receive the background sound source and generate a fourth voltage signal based on the background sound source, wherein the talker sound source comprises the primary talker sound source and the third-party talker sound source, the first voltage signal and the third voltage signal have a same phase, and the second voltage signal and the fourth voltage signal have different phases; and the sound collecting and processing module is configured to retain the talker sound source based on the first voltage signal and the third voltage signal and remove the background sound source based on the second voltage signal and the fourth voltage signal to send the talker sound source to the loudspeaker unit.

2. The intelligent call noise reduction device of claim 1, further comprising a human body sensing module and a micro-processing module, wherein the human body sensing module is configured to sense whether another person is near to the second microphone and output a sensing signal to the micro-processing module when sensing that the another person is near to the second microphone, and the micro-processing module is configured to send the sensing signal to the sound collecting and processing module; and the sound collecting and processing module is configured to send the primary talker sound source and the third-party talker sound source to the loudspeaker unit when receiving the sensing signal and send the primary talker sound source to the loudspeaker unit when receiving no sensing signal.

3. The intelligent call noise reduction device of claim 2, wherein the first microphone is configured to, when no other person is close, receive the primary talker sound source and generate the first voltage signal based on the primary talker sound source and configured to assist in receiving the background sound source and generate the second voltage signal based on the background sound source;

the second microphone is configured to, when no other person is close, receive the background sound source and generate the fourth voltage signal based on the background sound source and configured to assist in receiving the primary talker sound source and generate a primary-call third voltage signal based on the primary talker sound source, wherein the first voltage signal and the primary-call third voltage signal have a same phase, and the second voltage signal and the fourth voltage signal have different phases; and the sound collecting and processing module is configured to, when receiving no sensing signal, retain the primary talker sound source based on the first voltage signal and the primary-call third voltage signal and remove the background sound source based on the second voltage signal and the fourth voltage signal to send the primary talker sound source to the loudspeaker unit.

4. The intelligent call noise reduction device of claim 2, wherein the first microphone is further configured to, when another person is close, receive the primary talker sound source and generate a primary-call first voltage signal based on the primary talker sound source and configured to assist in receiving the background sound source and the third-party talker sound source, generate the second voltage signal based on the background sound source, and generate a secondary-call first voltage signal based on the third-party talker sound source;

the second microphone is further configured to, when another person is close, receive the third-party talker sound source and the background sound source, generate a secondary-call third voltage signal based on the third-party talker sound source, and generate the fourth voltage signal based on the background sound source and configured to assist in receiving the primary talker sound source and generate a primary-call third voltage signal based on the primary talker sound source, wherein the primary-call first voltage signal and the primary-call third voltage signal have a same phase, the secondary-call first voltage signal and the secondary-call third voltage signal have a same phase, and the second voltage signal and the fourth voltage signal have different phases; and the sound collecting and processing module is configured to, when receiving the sensing signal, retain the primary talker sound source based on the primary-call first voltage signal and the primary-call third voltage signal, retain the third-party talker sound source based on the secondary-call first voltage signal and the secondary-call third voltage signal, and remove the background sound source based on the second voltage signal and the fourth voltage signal to send the primary talker sound source and the third-party talker sound source to the loudspeaker unit.

5. The intelligent call noise reduction device of claim 3, further comprising at least one third microphone, wherein a third microphone of the at least one third microphone is configured to receive an environmental noise source and generate a fifth voltage signal based on the environmental noise source;

the first microphone is further configured to assist in receiving the environmental noise source and generate a sixth voltage signal based on the environmental noise source, wherein the fifth voltage signal and the sixth voltage signal have different phases; and the sound collecting and processing module is further configured to remove the environmental noise source based on the fifth voltage signal and the sixth voltage signal when receiving the sensing signal to send the primary talker sound source and the third-party talker sound source to the loudspeaker unit and remove the environmental noise source based on the fifth voltage signal and the sixth voltage signal when receiving no sensing signal to send the primary talker sound source to the loudspeaker unit.

6. An intelligent call noise reduction method, the method being applied to the intelligent call noise reduction device of claim 1 and comprising:

receiving the first voltage signal generated by the first microphone based on the talker sound source and the second voltage signal generated by the first microphone based on the background sound source;

receiving the third voltage signal generated by the second microphone based on the talker sound source and the fourth voltage signal generated by the second microphone based on the background sound source; and retaining the talker sound source based on a phase relationship between the first voltage signal and the third voltage signal and removing the background sound source based on a phase relationship between the second voltage signal and the fourth voltage signal to denoise the talker sound source.

7. The intelligent call noise reduction method of claim 6, further comprising:

determining whether a sensing signal is received;

in response to receiving no sensing signal, receiving the first voltage signal generated by the first microphone based on the primary talker sound source, receiving the second voltage signal generated by the first microphone based on the background sound source, receiving the fourth voltage signal generated by the second microphone based on the background sound source, receiving a primary-call third voltage signal generated by the second microphone based on the primary talker sound source, and executing a first noise reduction mode, wherein the first noise reduction mode comprises retaining the primary talker sound source based on the first voltage signal and the third voltage signal and removing the background sound source based on the second voltage signal and the fourth voltage signal to denoise the primary talker sound source; and in response to receiving the sensing signal, receiving a primary-call first voltage signal generated by the first microphone based on the primary talker sound source, receiving the second voltage signal generated by the first microphone based on the background sound source, receiving a secondary-call first voltage signal generated by the first microphone based on the third-party talker sound source, receiving the fourth voltage signal generated by the second microphone based on the background sound source, a secondary-call third voltage signal generated by the second microphone based on the third-party talker sound source, a primary-call third voltage signal generated by the second microphone based on the primary talker sound source, and executing a second noise reduction mode, wherein the second noise reduction mode comprises retaining the talker sound source based on the primary-call first voltage signal and the primary-call third voltage signal, retaining the third-party talker sound source based on the secondary-call first voltage signal and the secondary-call third voltage signal, and removing the background sound source based on the phase relationship between the second voltage signal and the fourth voltage signal to denoise the primary talker sound source and the third-party talker sound source.

8. The intelligent call noise reduction method of claim 7, wherein the intelligent call noise reduction device further comprises at least one third microphone; and the intelligent call noise reduction method further comprises:

receiving a fifth voltage signal generated by a third microphone of the at least one third microphone based on an environmental noise source;

in response to receiving no sensing signal, further receiving a sixth voltage signal generated by the first microphone based on the environmental noise source and executing a third noise reduction mode, wherein the third noise reduction mode comprises retaining the primary talker sound source based on the first voltage signal and the third voltage signal, removing the background sound source based on the second voltage signal and the fourth voltage signal, and removing the environmental noise source based on the fifth voltage signal and the sixth voltage signal to denoise the primary talker sound source; and in response to receiving the sensing signal, further receiving a sixth voltage signal generated by the first microphone based on the environmental noise source and executing a fourth noise reduction mode, wherein the fourth noise reduction mode comprises retaining the primary talker sound source based on the primary-call first voltage signal and the primary-call third voltage signal, retaining the third-party talker sound source based on the secondary-call first voltage signal and the secondary-call third voltage signal, removing the background sound source based on the second voltage signal and the fourth voltage signal, and removing the environmental noise source based on the fifth voltage signal and the sixth voltage signal to denoise the primary talker sound source and the third-party talker sound source.

9. The intelligent call noise reduction method of claim 8, further comprising:

performing passive noise reduction on the retained primary talker sound source and the third-party talker sound source.

10. An intelligent call noise reduction headphone, comprising a first microphone, a second microphone, a sound collecting and processing module, a loudspeaker unit, a left earmuff, and a right earmuff, wherein the first microphone is near to a primary talker sound source and disposed on the left earmuff, the second microphone is near to a third-party talker sound source and disposed on the right earmuff, and the sound collecting and processing module and the loudspeaker unit are disposed inside the left earmuff;

the first microphone is configured to receive a talker sound source and generate a first voltage signal based on the talker sound source and receive a background sound source and generate a second voltage signal based on the background sound source;

the second microphone is configured to receive the talker sound source and generate a third voltage signal based on the talker sound source and receive the background sound source and generate a fourth voltage signal based on the background sound source, wherein the talker sound source comprises the primary talker sound source and the third-party talker sound source, the first voltage signal and the third voltage signal have a same phase, and the second voltage signal and the fourth voltage signal have different phases; and the sound collecting and processing module is configured to retain the talker sound source based on the first voltage signal and the third voltage signal and remove the background sound source based on the second voltage signal and the fourth voltage signal to send the talker sound source to the loudspeaker unit.

* * * * *